US006533180B1

(12) United States Patent
Wood

(10) Patent No.: US 6,533,180 B1
(45) Date of Patent: Mar. 18, 2003

(54) SECURITY LABEL AND METHOD OF USE

(75) Inventor: Glenn P. Wood, Shepshed (GB)

(73) Assignee: Applied Opsec, Inc., Parkton, MD (US)

( * ) Notice: Subject to any disclaimer, the term of this patent is extended or adjusted under 35 U.S.C. 154(b) by 0 days.

(21) Appl. No.: 09/423,777

(22) PCT Filed: May 13, 1997

(86) PCT No.: PCT/US97/08024

§ 371 (c)(1), (2), (4) Date: Nov. 12, 1999

(87) PCT Pub. No.: WO98/52178

PCT Pub. Date: Nov. 19, 1998

(51) Int. Cl.[7] .............................................. G06K 19/06
(52) U.S. Cl. .......................... 235/494; 283/81; 283/101
(58) Field of Search ................................ 235/494, 454, 235/457; 283/81, 94, 93, 98, 99, 100, 101

(56) References Cited

U.S. PATENT DOCUMENTS

| | | | | | |
|---|---|---|---|---|---|
| 4,269,473 | A | | 5/1981 | Flothmann et al. | |
| 4,824,144 | A | | 4/1989 | Tasma | |
| 4,833,122 | A | * | 5/1989 | Doll et al. | 503/226 |
| 4,913,504 | A | * | 4/1990 | Gallagher | 350/3.6 |
| 4,921,277 | A | | 5/1990 | McDonough | |
| 4,976,456 | A | | 12/1990 | Jack | |
| 5,021,273 | A | * | 6/1991 | Kobayashi | 428/40 |
| 5,039,652 | A | * | 8/1991 | Doll et al. | 503/206 |
| 5,042,842 | A | * | 8/1991 | Green et al. | 283/101 |
| 5,048,870 | A | | 9/1991 | Mangini et al. | |
| 5,059,776 | A | | 10/1991 | Antes | |
| 5,064,717 | A | * | 11/1991 | Suzuki et al. | 428/352 |
| 5,124,187 | A | * | 6/1992 | Aeschbacher et al. | 428/40 |
| 5,306,899 | A | | 4/1994 | Marom et al. | |
| 5,370,763 | A | | 12/1994 | Curiel | |
| 5,422,744 | A | | 6/1995 | Katz et al. | |
| 5,426,520 | A | | 6/1995 | Kakae et al. | |
| 5,438,403 | A | | 8/1995 | Hoshino et al. | |
| 5,492,370 | A | * | 2/1996 | Chatwin et al. | 283/110 |
| 5,851,615 | A | * | 12/1998 | Kay | 428/40.1 |
| 5,866,236 | A | * | 2/1999 | Faykish et al. | 428/195 |
| 6,196,383 | B1 | * | 3/2001 | Pinchen et al. | 206/264 |

FOREIGN PATENT DOCUMENTS

| | | | |
|---|---|---|---|
| EP | 201 323 A2 | * | 12/1986 |
| EP | 325086 | * | 8/1989 |
| WO | 91-06925 | * | 5/1991 |

* cited by examiner

*Primary Examiner*—Michael G. Lee
*Assistant Examiner*—Diane I. Lee
(74) *Attorney, Agent, or Firm*—Brij K. Agarwal; David V. Radack; Eckert Seamans Cherin & Mellott, LLC

(57) ABSTRACT

A security label including a label liner having a first adhesive layer and a piggy-back label removably secured to the liner by a second adhesive layer. An associated package having the security label placed thereon, as well as associated methods are also disclosed.

24 Claims, 4 Drawing Sheets

SECURITY LABEL AND METHOD OF USE

BACKGROUND OF THE INVENTION

This invention relates to a security label, an associated package and associated methods, and more particularly, to a security label that is useful in (i) providing documentary evidence that an authentic product was used and (ii) providing a visually obvious method to determine if a product contained in a package is authentic.

The use of counterfeit or non-genuine products is, unfortunately, a serious problem in many situations. For example, the use of counterfeit automobile or aircraft parts not only constitutes a fraud on the purchaser but also may lead to serious safety problems. Even more seriously, the use of non-authentic or generic pharmaceutical products when the authentic pharmaceutical product is thought to be used can cause serious health consequences for the patient and can lead to malpractice claims against physicians and hospitals.

What is needed, therefore, is a security label that can be used to determine the authenticity of the product contained in a package and that can also be used to provide documentary evidence that an authentic product was used in repairing a car or aircraft or that the proper drug is used in patient care.

SUMMARY OF THE INVENTION

The invention has met or exceeded the above-mentioned needs, as well as others. The security label of the invention comprises a label liner including a first adhesive layer and a piggy-back label removably secured to the label liner. An associated package having the security label placed thereon is also disclosed. The package is adapted to contain replacement parts, such as aircraft and automobile parts, and pharmaceutical products.

The invention also provides a method of providing documentary evidence of the use of an authentic product. The method comprises providing a package containing an authentic product and placing thereon a security label having a structure that was described above. The piggy-back label of the security label is then removed from the label liner of the security label and placed on a document. In this way, the document indicates that the authentic product has been used. The removal of the piggy-back label also prevents re-use of the package for non-authentic products.

Finally, the invention also provides a method of visually verifying the authenticity of a product contained in a package. The method comprises placing on the package a security label having a structure that was described above. The method then comprises observing the security label on the package to determine the presence or absence of the piggy-back label on the label backing. The absence of the piggy-back label indicates to the user that a non-authentic product may be contained in the package.

BRIEF DESCRIPTION OF THE DRAWINGS

A full understanding of the invention can be gained from the following description of the preferred embodiment when read in conjunction with the accompanying drawings in which.

DETAILED DESCRIPTION

Figure 1:
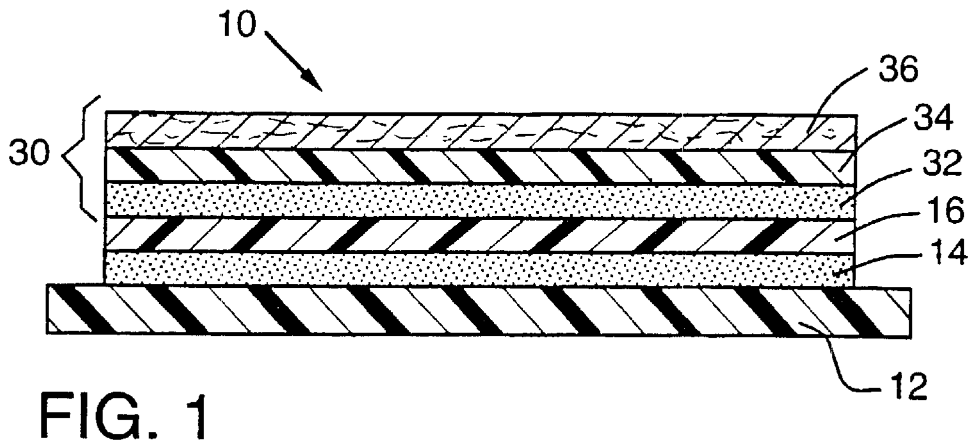
FIG. 1 is a sectional view of the security label of the invention.

Referring now to FIG. 1, a cross-sectional view of an embodiment of the security label 10 of the invention is shown. The security label 10 consists of several different layers, the bottom of which is a release liner layer 12 that is used for shipping or transporting the security label 10 to its ultimate destination where it is placed on a package. The release liner layer 12 is preferably made of plastic or paper and is adapted to be peeled from the remainder of the security label 10 when it is desired to expose the adhesive layer 14 of the security label. A suitable release liner layer 12 is one made by the 3M Company of St. Paul, Minn. The release liner layer 12 is preferably about 0.0005 to 0.0050 inches thick with 0.0015 to 0.0025 inches being preferred.

A first adhesive layer 14 is provided on the release liner layer 12. Preferably, the first adhesive layer 14 is pre-coated onto the label liner 16. A suitable adhesive material is one made by the 3M Company of St. Paul, Minn. The adhesive layer 14 is preferably about 0.0002 to 0.0040 inches thick with 0.0005 to 0.0010 inches being preferred.

The label liner 16 is similar to release liner layer 12 only the label liner 16 includes the adhesive layer 14. The dimensions and composition of the label liner 16 are preferably similar (although this is not necessary) to the dimensions and composition of release liner layer 12.

The piggy-back label 30 of the invention is disposed on top of the label liner 16. The piggy-back label 30, in the embodiment shown in FIG. 1, consists of a second adhesive layer 32 disposed on a label layer 34 having printed thereon indicia 36. Again, the label layer 34 is preferably pre-coated with the second adhesive layer 32. The piggy-back label 30 is removably secured to the liner 16 for transfer to a document, for example, as will be explained further below. The second adhesive layer 32 is preferably about 0.0002 to 0.0040 inches thick with 0.0005 to 0.0010 inches being preferred. A suitable adhesive material is one made by the 3M Company of St. Paul, Minn.

The label layer 34 is disposed on top of the adhesive layer 32 and is removed along with the adhesive layer 32 from the liner 16 in accordance with the method of the invention which will be discussed below. The label layer 34 shown in FIG. 1 is made of polyester and can range from about 0.0005 to 0.0050 inches thick with 0.0015 to 0.0025 inches being preferred. A suitable label layer 34 is one made by Vacumet Corporation of Wayne, N.J. under the tradename designation of Barrier-Met™. It will be appreciated that the label layer 34 and adhesive 32 can be provided as an integral unit.

The indicia 36 on the label layer 34 may be applied by human or mechanical means and can include words, symbols or numbers, colors or other information containing means. One embodiment can be a printed indicia, such as barcode. It will be appreciated, however, that indicia 36 need not be used as layer 34 itself can impart the necessary information without the need for indicia 36 by, for example, being a specific color or containing a pattern.

Figure 2:
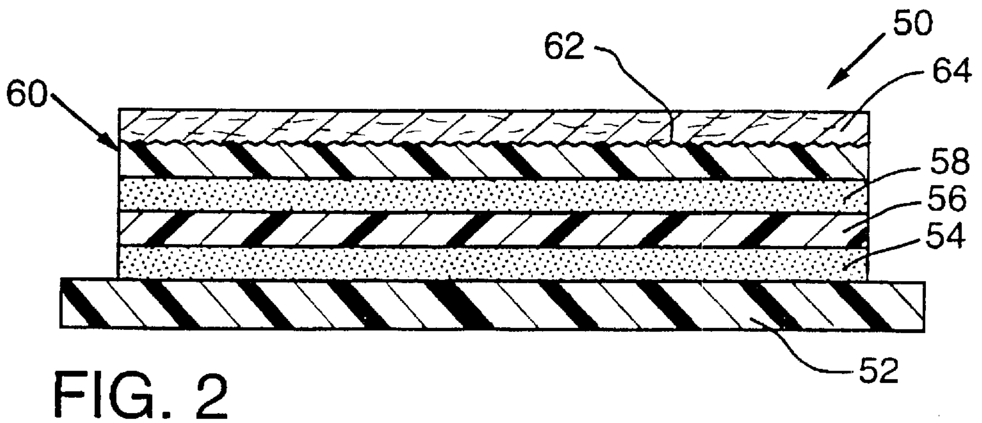
FIG. 2 is a sectional view of another embodiment of the security label of the invention.

FIG. 2 shows an alternate type of label layer from the label layer 34 shown in FIG. 1. The security label 50 shown in FIG. 2 includes a release layer 52, a first adhesive layer 54, a liner 56 and a second adhesive layer 58, similar to those described above with respect to FIG. 1. The label layer of FIG. 2, however, is a diffractive label layer 60 that includes a micro-embossed relieved surface 62. The indicia 64 can be printed on the relieved surface 62. As used herein, the term "diffractive label layer" means a label layer which exhibits an optical diffractive effect when exposed to light. As shown in FIG. 2, the relieved surface 62 of the diffractive label layer 60 creates an optically diffractive effect when exposed to light. An alternate method of creating an optically diffractive effect is by providing a diffractive label layer having diffraction gratings. The diffractive label layer resists unauthorized photocopy duplication of the security label, either initially or when placed on a document as will be explained below, thus providing an extra measure of security.

Figure 3:
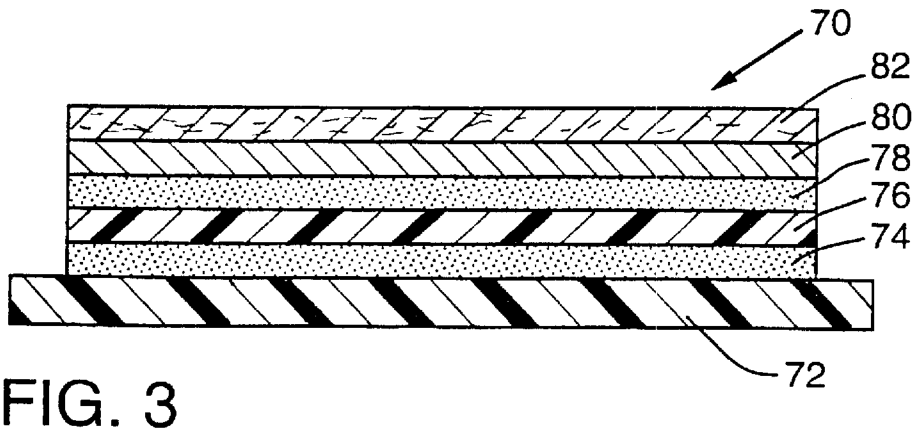
FIG. 3 is a sectional view of yet another embodiment of the security label of the invention.

Referring now to FIG. 3, another embodiment of the security label is shown. Security label 70 also includes a release layer 72, a first adhesive layer 74, a liner 76 and a second adhesive layer 78, similar to those described above with respect to FIG. 1. The label layer of FIG. 2, however, is a holographic label layer 80. The indicia 82 can be printed on the holographic label layer 80. The holographic label layer 80, as with the diffractive label layer 60, resists unauthorized photocopy duplication of the security label, either initially or when placed on a document as will be explained below, thus providing an extra measure of security.

It will be appreciated that in both embodiments shown in FIGS. 2 and 3, that the indicia 64 and 82 (as with indicia 36 of FIG. 1) need not be provided.

Figure 4:
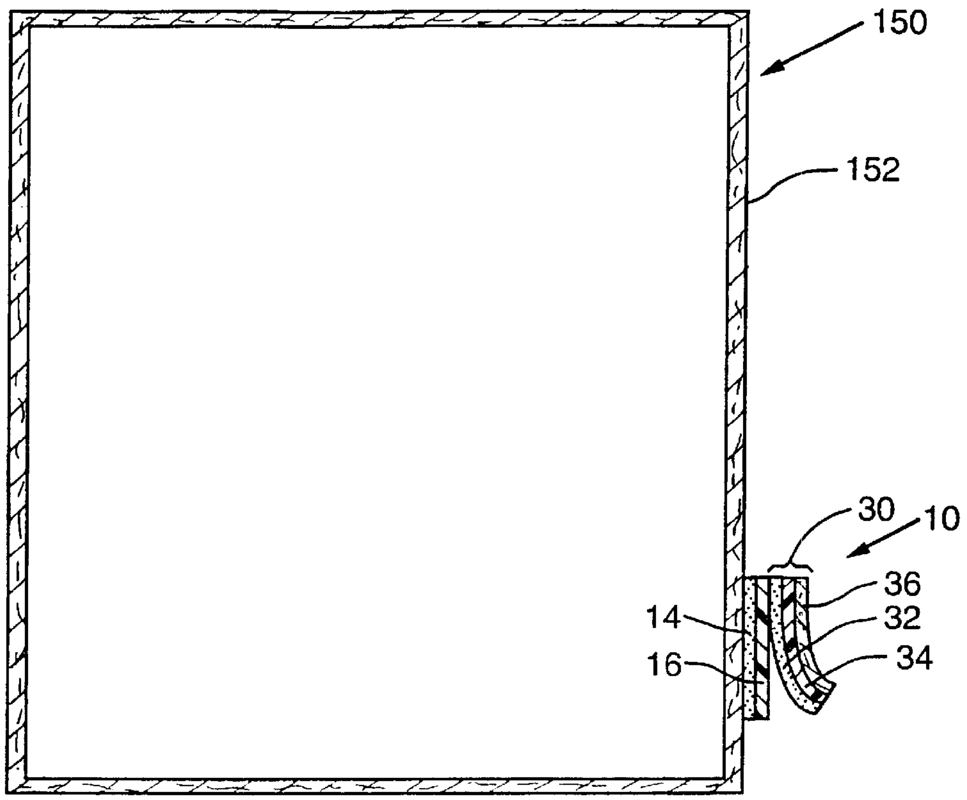
FIG. 4 is a side elevational view of a package having place thereon a security label.

In use, the security label 10 is placed on a package, such as package 150 shown in FIG. 4. In order to place the security label 10 on the package 150, the bottom release liner layer 12 is removed, thus exposing the adhesive layer 14. The adhesive layer 14 is then press-applied to a surface 152 of the package 150 with the indicia 36 being exposed. It will be appreciated that the thickness of the security label 10 as shown in FIG. 4 is greatly exaggerated for purposes of illustration only.

The package 150 is adapted to contain authentic products. Such authentic products include, but are not limited to, replacement parts for automobiles and aircraft as well as pharmaceuticals. In fact, any product whose authenticity it is desired to ensure can be protected by the security label 10 and the method of the invention.

Figure 5:
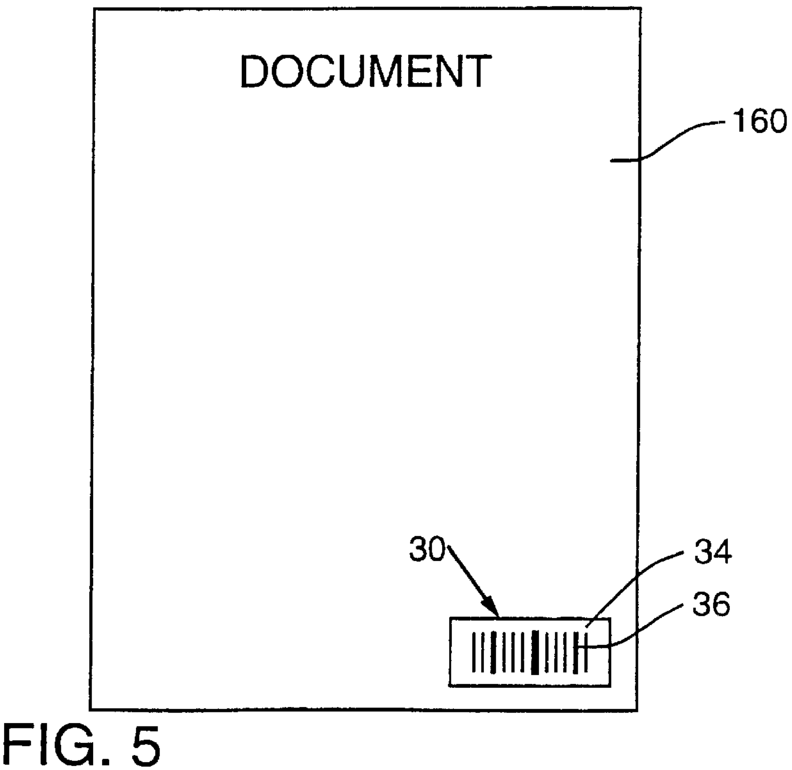
FIG. 5 is a plan view of a document having the piggy-back label of the invention placed thereon.
Figure 6:
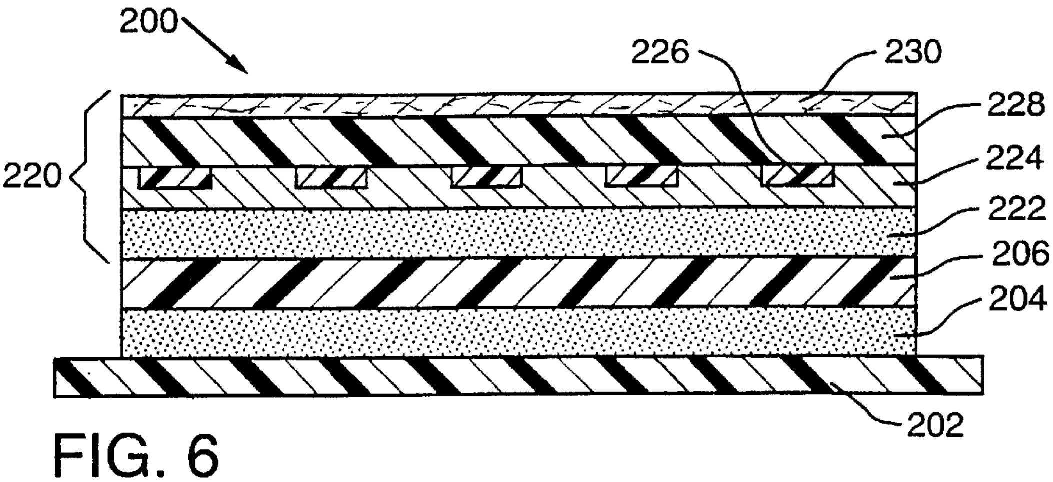
FIG. 6 is a sectional view of still another embodiment of the security label of the invention.

Referring now to both FIGS. 4 and 5, the methods of the invention will be discussed. When it is desired to use the authentic product contained in the package 150, an authorized user (either before or after removing the product from the package 150) removes the piggy-back label 30 from the liner 16 as shown in FIG. 4 and places the piggy-back label 30, using the adhesive layer 32, on a separate document, such as document 160 shown in FIG. 5. As used herein the term "document" includes any information bearing item, for example, a work order or a page in a log book. The presence of the piggy-back label 30 on the document 160 indicates to the observer of the document 160 that an authentic product has been used. For example, an auto or aircraft mechanic can place the piggy-back label 30 of the invention on a work order to prove that an authentic replacement part has been used. In another embodiment, a health-care worker can place the piggy-back label 30 on a patient's records to show that the proper drug has been administered to the patient. It will be appreciated that the method of verification provided by the invention will clearly reduce the incidences of using a non-authentic product. In addition, the package 150 itself, with the piggy-back label 30 removed, can now not be re-used to contain a non-authentic part.

In lieu of security label 10, security label 50 or security label 70 can be used. It will be appreciated that once the piggy-back labels of security label 50 or security label 70 are placed on the document 160, the document 160 is photocopy resistant because of the diffractive label layer 60 or holographic label layer 80, respectively. This provides an extra measure of security for the document 160.

Another method of the invention involves verifying the authenticity of a product contained in the package before use of the product. This method involves placing a security label on a package as was described above. The method then involves observing the security label to determine the presence or absence of the piggy-back label on the backing label. If the piggy-back label is not on the backing label, this is an indication that the product contained in the package is not genuine.

Figure 7A:
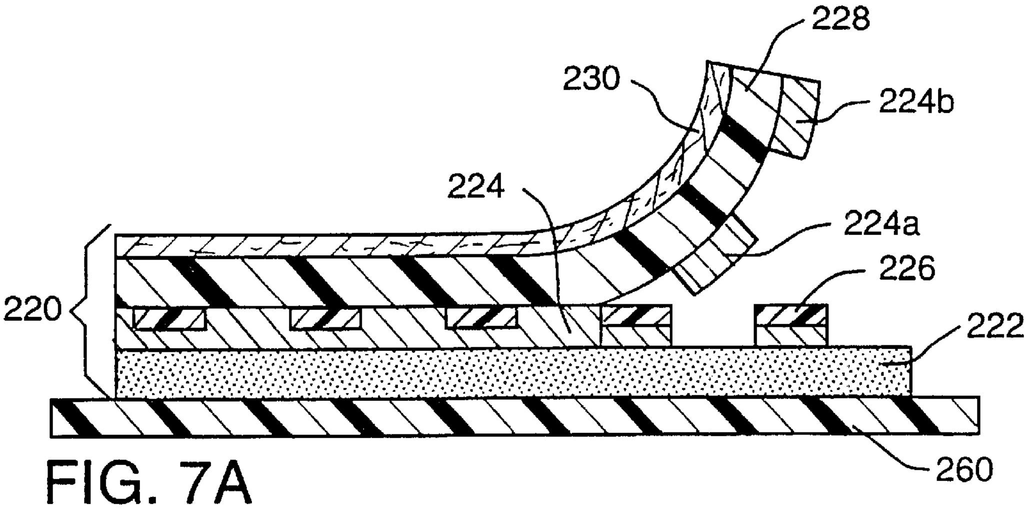
FIG. 7A is a sectional view showing the piggy-back label of the security label of the security label shown in FIG. 6 as applied to a document when an attempt is made to remove the piggy-pack label from the document.
Figure 7B:
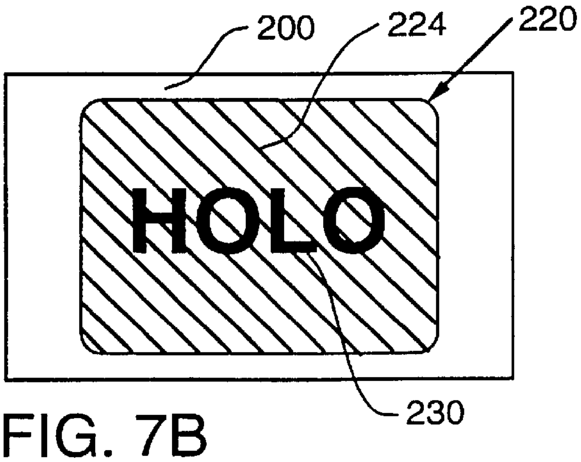
FIG. 7B is a top plan view showing the piggy-back label applied to the document.
Figure 7C:
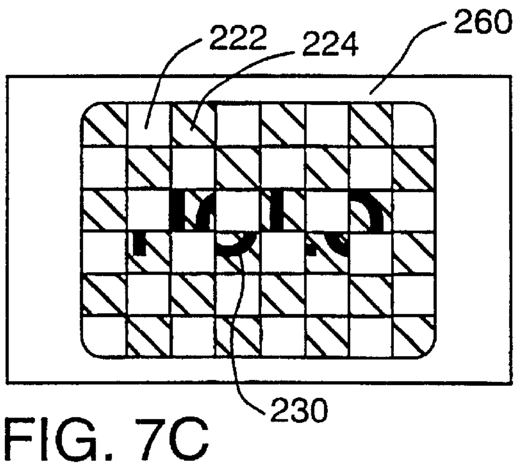
FIG. 7C is a top plan view similar to FIG. 7B only showing the result of attempting the removal of the piggy-back label from the document.

A further embodiment of the invention, shown in FIGS. 6 and 7A–7C, includes a tamper evident feature. This security label 200 also includes a release layer 202, a first adhesive layer 204 and a liner 206 similar to those shown in FIG. 1. The piggy-back label 220, however, consists of a second adhesive layer 222 which is preferably about 0.0002 to 0.0040 inches thick with 0.0005 to 0.0010 inches being preferred, made of rubber or acrylic based pressure sensitive adhesive made by the 3M Company of St. Paul, Minn.; a metallic layer 224 which is preferably about 30 Angstroms (Å) to 2000 Å inches thick with 200 Å to 500 Å inches being preferred, made of aluminum. The piggy-back label 220 further consists of patterned release layer 226 an a support layer 228 which is sold as a unit by Flexcon of Spencer, Massachusetts under the tradename of TAMPERMARK™ with, optionally, indicia 230 printed thereon. The patterned release layer 226, usually consisting of a wax, is coated in intermittent fashion, such as by dots or checkerboard pattern, onto the metallic layer 224. In this embodiment, the piggy-back label 220 can be removed from the liner 206 and placed on a document, such as document 260 in FIG. 7, without damaging the piggy-back label 220. Once the piggy-back label 220 is placed on the document 260 (as shown in FIGS. 7A–7C), any attempt to remove the label therefrom will result in portions 224*a* and 224*b* (FIG. 7A) of the metallic layer 224 being pulled off of the document 260. As can be seen in FIG. 7C, this provides a clear, visual indication of tampering. It will be appreciated that FIGS. 7A and 7C show that the adhesive layer 222 remains on the document, however, a portion of the adhesive layer 222 can also be pulled off the document, along with portions 224*a* and 224*b* (FIG. 7A). This depends on how strongly the label 220 is bound to the document. The key result, however, is the destruction of the metallic layer 224, which provides the visual indication of tampering.

It will be appreciated that the diffractive label layer and holographic layer label described in FIGS. 2 and 3 can be combined with the tamper evident feature discussed above in FIGS. 6 and 7.

Figure 8:
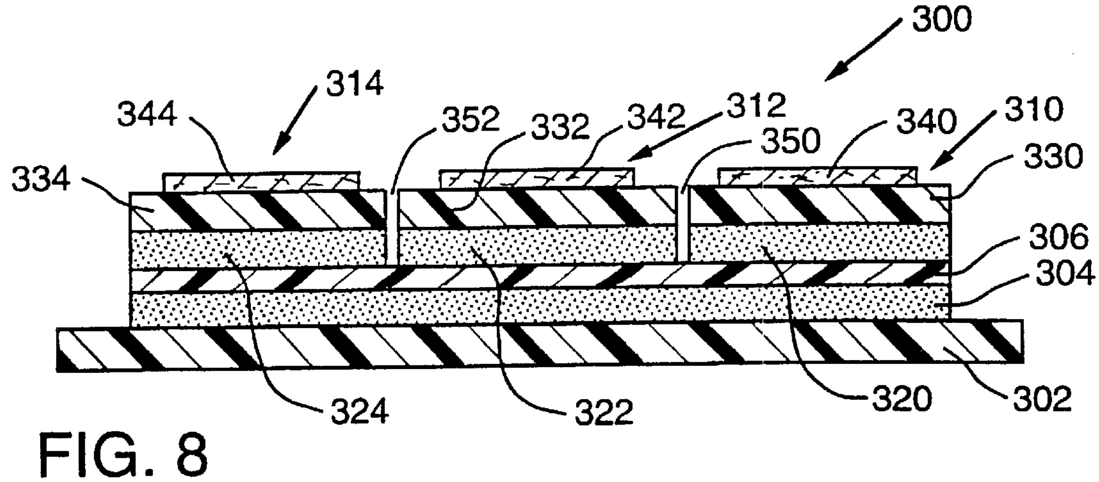
FIG. 8 is a sectional view of the multipart piggy-back label embodiment of the invention.
Figure 9:
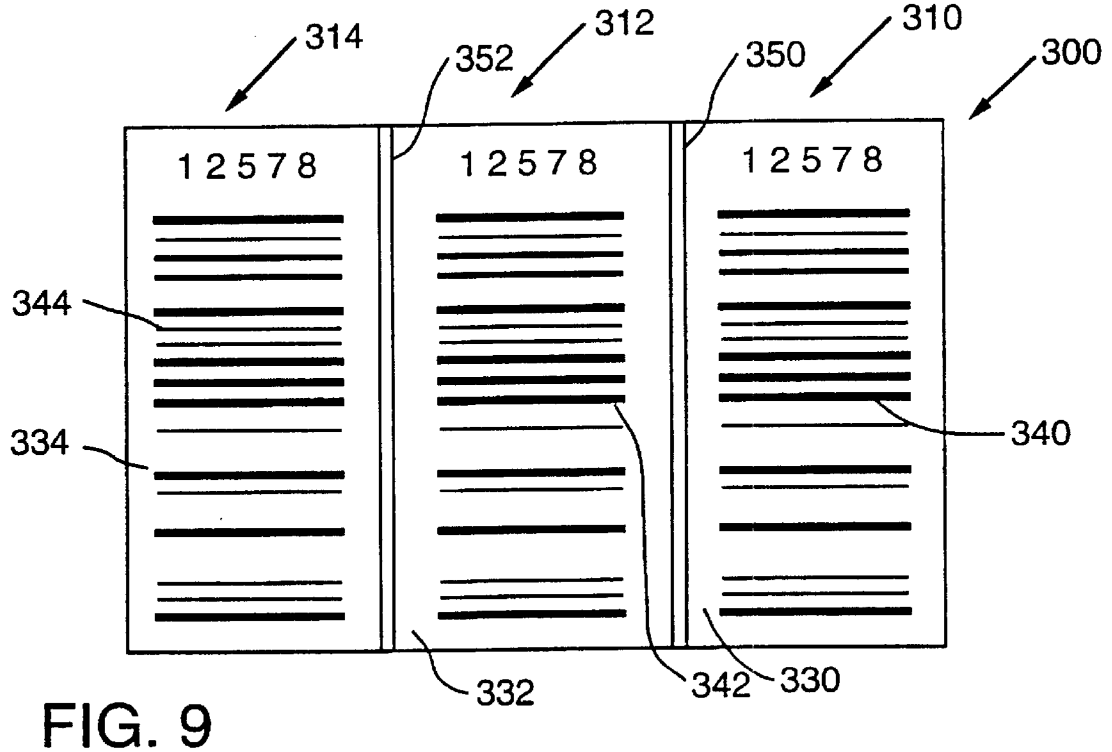
FIG. 9 is a top plan view of the label shown in FIG. 8.

Referring now to FIGS. 8 and 9, a multi-piggy-back label security label 300 is shown. The multi-piggy-back label security label 300 consists of a release layer 302, a first adhesive layer 304 and a liner 306 similar to those shown in FIG. 1. In this embodiment, however, three separate piggy-back labels 310, 312 and 314 are provided on a single label backing 320. The piggy-back labels 310, 312 and 314 each include (i) a second adhesive layer 320, 322 and 324; (ii) a label layer 330, 332 and 334; and (iii) separate indicia, in this case, barcodes 340, 342 and 344. As can be seen in FIG. 9, in a preferred embodiment the barcode indicia 340, 342 and 344 are identical. The piggy-back labels 310, 312 and 314 are separated by slits 350 and 352 which penetrate the label layers 330, 332 and 334 and second adhesive layers 320, 322 and 324 so that each piggy-back label 310, 312 and 314 can be separately removed from the common label backing 320.

This embodiment in FIGS. 8 and 9 is useful when multiple documents need to have proof that a genuine part has been used. For example, once the security label 300 is affixed to a package (not shown), and the part contained in that package is used, each piggy-back label 310, 312 and 314 can be removed from the liner 306 and placed on separate documents. For example, piggy-back label 310 can be removed from liner 306 and placed on a work order, piggy-back label 312 can be placed on a service record and piggy-back label 314 can be placed in a log book. In this way, one unitary security label can provide proof on multiple documents and records that a genuine part has been used. It will be appreciated that although three piggy-back labels are shown in FIGS. 8 and 9, any desired number of piggy-back labels can be provided on a single, unitary security label. As mentioned above, the embodiment shown in FIGS. 8 and 9 can include the diffraction label layer shown in FIG. 2 or the holographic label layer shown in FIG. 3 and/or the tamper evident label layer shown in FIGS. 6 and 7A–7C.

It will be appreciated that a security label, an associated package and associated methods have been disclosed which are useful in not only verifying the authenticity of a product but also providing documentary evidence that an authentic product has been used.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A security label comprising:

a label liner including a first adhesive layer; and a piggy-back label removably secured to said label liner;

wherein said piggy-back label is a tamper evident label; and wherein said piggyback label includes (i) a second adhesive layer; (ii) a metallic layer disposed on said second adhesive layer; (iii) a support layer; and (iv) a release layer interposed between said support layer and said metallic layer.

2. The security label of claim 1, wherein said piggy-back label includes the second adhesive layer such that said piggy-back label can be adhered to a document after being removed from said label liner.

3. The security label of claim 1, wherein said piggy-back label is a diffractive label.

4. The security label of claim 3, wherein said diffractive label includes a diffractive label layer having a relieved surface.

5. The security label of claim 1, wherein said piggy-back label is a holographic label.

6. The security label of claim 1, wherein said piggy-back label includes indicia.

7. The security label of claim 6, wherein said indicia is a bar code.

8. The security label of claim, 1 wherein said release layer is disposed in a pattern.

9. The security label of claim 8, wherein said pattern is a checkerboard pattern.

10. The security label of claim 1, including a plurality of piggy-back labels removably secured to said label liner.

11. The security label of claim 10, wherein each of said piggy-back labels contains identical indicia.

12. The security label of claim 1, including a release layer underlying said first adhesive layer.

13. A package having secured thereto a security label comprising:

a label liner including a first adhesive layer;

a piggy-back label removably secured to said label liner, wherein said piggy-back label is a tamper evident label; and wherein said piggy-back label includes (i) a second adhesive layer:

(ii) a metallic layer disposed on said second adhesive layer;

(iii) a support layer; and (iv) a release layer interposed between said support layer and said metallic layer.

14. The package of claim 13, wherein said package is adapted to contain pharmaceuticals.

15. The package of claim 13, wherein said package is adapted to contain replacement parts.

16. The package of claim 15, wherein said replacement parts are selected from the group consisting of aircraft parts and automobile parts.

17. The package of claim 13, wherein said piggy-back label includes the second adhesive layer such that said piggy-back label can be adhered to a document after being removed from said label liner.

18. The package of claim 13, wherein said piggy-back label is a diffractive label.

19. The package of claim 18, wherein said diffractive label includes a diffractive label layer having a relieved surface.

20. The package of claim 13, wherein said piggy-back label is a holographic label.

21. The package of claim 13, wherein said piggy-back label includes indicia.

22. The package of claim 21, wherein said indicia is a bar code.

23. The package of claim 13, including plurality of piggy-back labels removably secured to said label liner.

24. The package of claim 23, wherein each of said piggy-back labels contains identical indicia.

* * * * *

UNITED STATES PATENT AND TRADEMARK OFFICE

CERTIFICATE OF CORRECTION

PATENT NO. : 6,533,180 B1
DATED : March 18, 2003
INVENTOR(S) : Glen P. Wood

It is certified that error appears in the above-identified patent and that said Letters Patent is hereby corrected as shown below:

Column 2,
Line 1, "place" should read -- placed --.

Column 5,
Line 57, "piggyback" should read -- piggy-back --.

Column 6,
Line 62, insert -- a -- prior to "plurality".

Signed and Sealed this

Thirtieth Day of September, 2003

JAMES E. ROGAN
*Director of the United States Patent and Trademark Office*